United States Patent [19]

Anderson et al.

[11] 4,240,741
[45] Dec. 23, 1980

[54] MODULAR PUNCH MARKING APPARATUS

[75] Inventors: Richard D. Anderson, Maple Grove; John A. Wedel, Minneapolis, both of Minn.

[73] Assignee: Pako Corporation, Minneapolis, Minn.

[21] Appl. No.: 63,674

[22] Filed: Aug. 6, 1979

[51] Int. Cl.³ .............................................. G03B 27/52
[52] U.S. Cl. ..................................................... 355/40
[58] Field of Search ....................... 355/28, 29, 40–42, 355/72, 74, 125, 132; 83/577

[56] References Cited

U.S. PATENT DOCUMENTS

| | | | |
|---|---|---|---|
| 3,209,644 | 10/1965 | Simmon et al. | 355/42 X |
| 3,844,253 | 10/1974 | Staub et al. | 355/29 X |
| 3,898,002 | 8/1975 | Kinder et al. | 355/40 |
| 3,947,109 | 3/1976 | Kinder et al. | 355/29 |
| 4,073,588 | 2/1978 | Zangenfeind et al. | 355/41 |
| 4,140,390 | 2/1979 | Schultheis et al. | 355/29 |
| 4,157,221 | 6/1979 | Rauen | 355/29 |

*Primary Examiner*—Donald A. Griffin
*Attorney, Agent, or Firm*—Kinney, Lange, Braddock, Westman and Fairbairn

[57] ABSTRACT

A photographic printer has a punch marking module for placing cut and end-of-order marks on the photographic paper. A quick connect/disconnect mounting assembly automatically centers the punch marking module properly with respect to a paper mask. The quick mounting assembly includes a pair of detent bars and registration pins on a mounting base attached to the paper mask. A rigid member and a pair of plate holders form the bottom of the punch marking module. A plurality of ball plungers engage a plurality of recesses in the detent bars and the end plate holders engage side edges of the mounting base. The ball plungers apply a force to the rigid member holding it against the registration pins in an engaging relationship.

14 Claims, 11 Drawing Figures

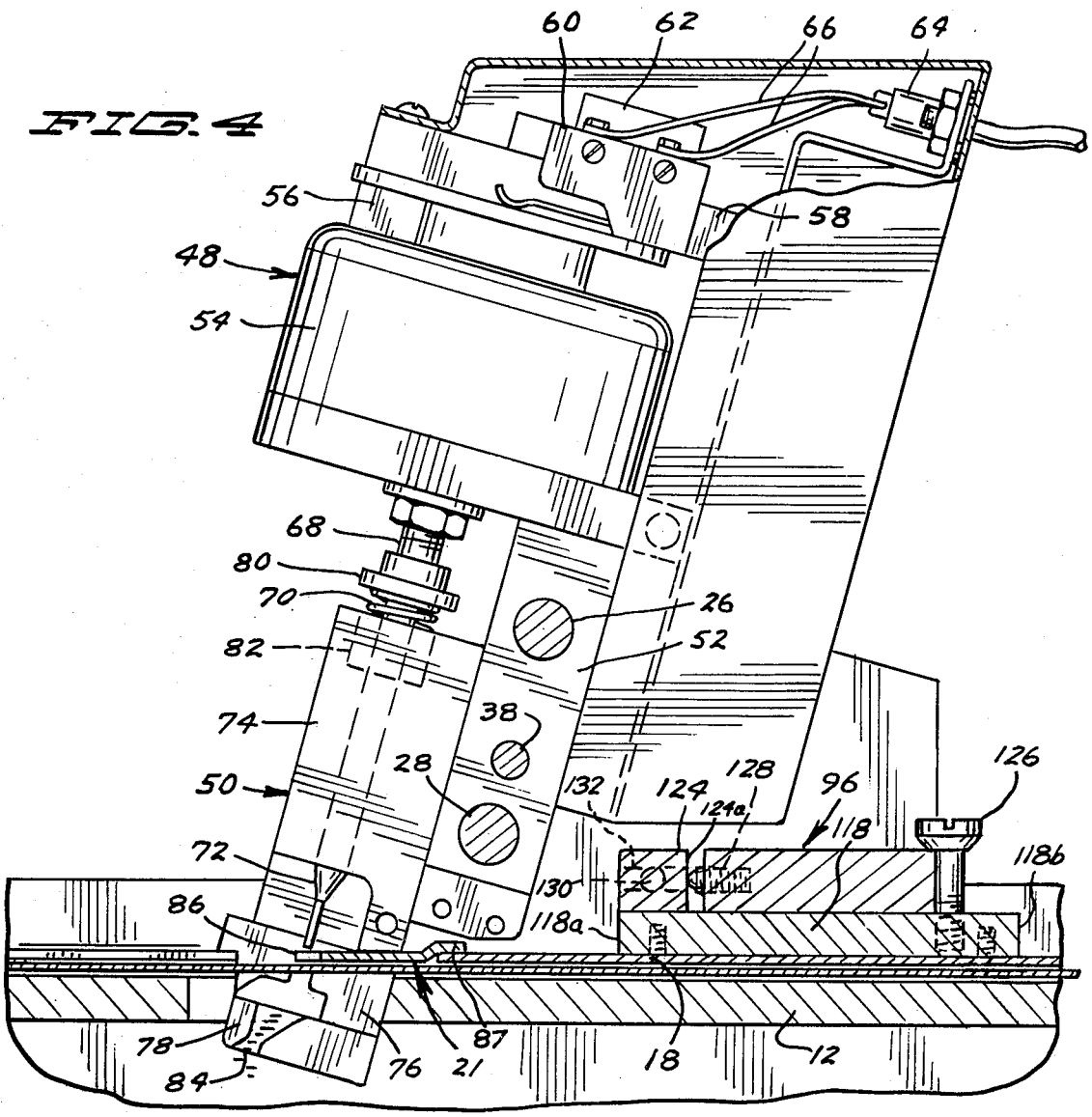
FIG. 4
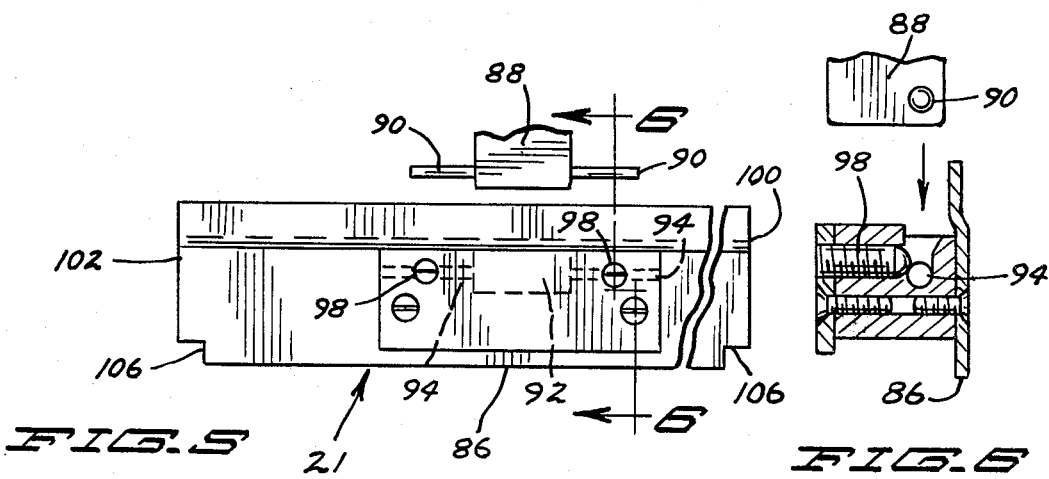
FIG. 5
FIG. 6

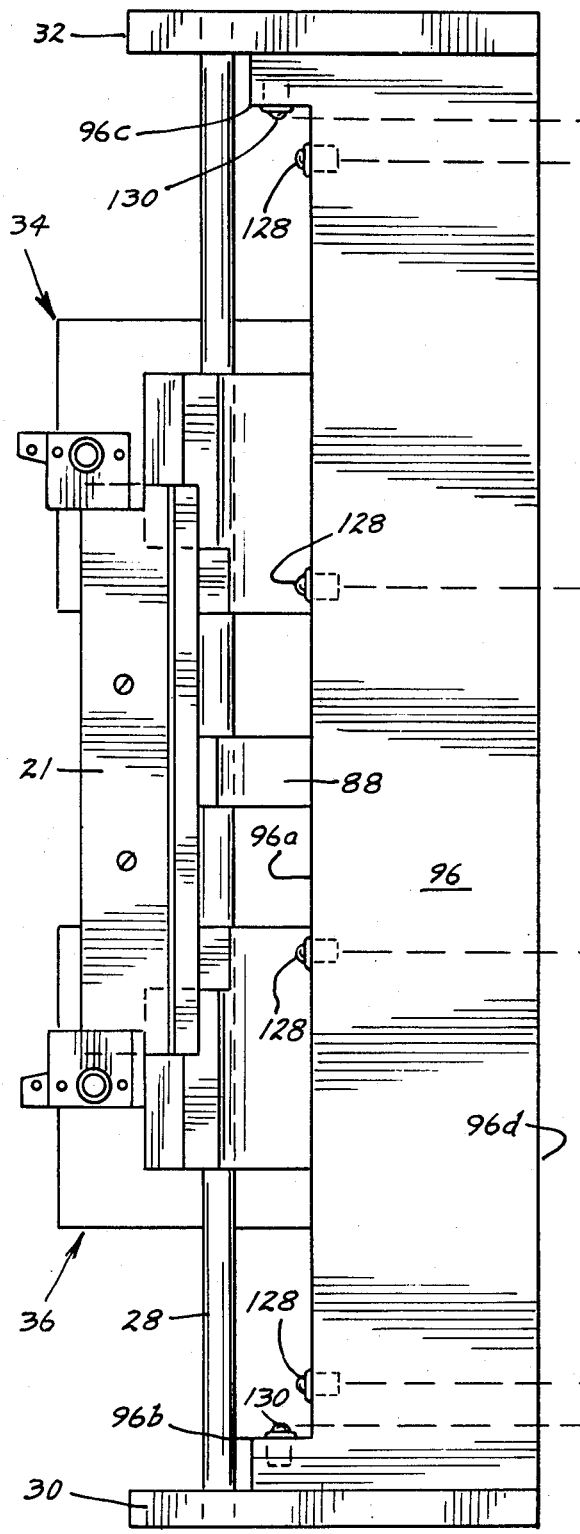
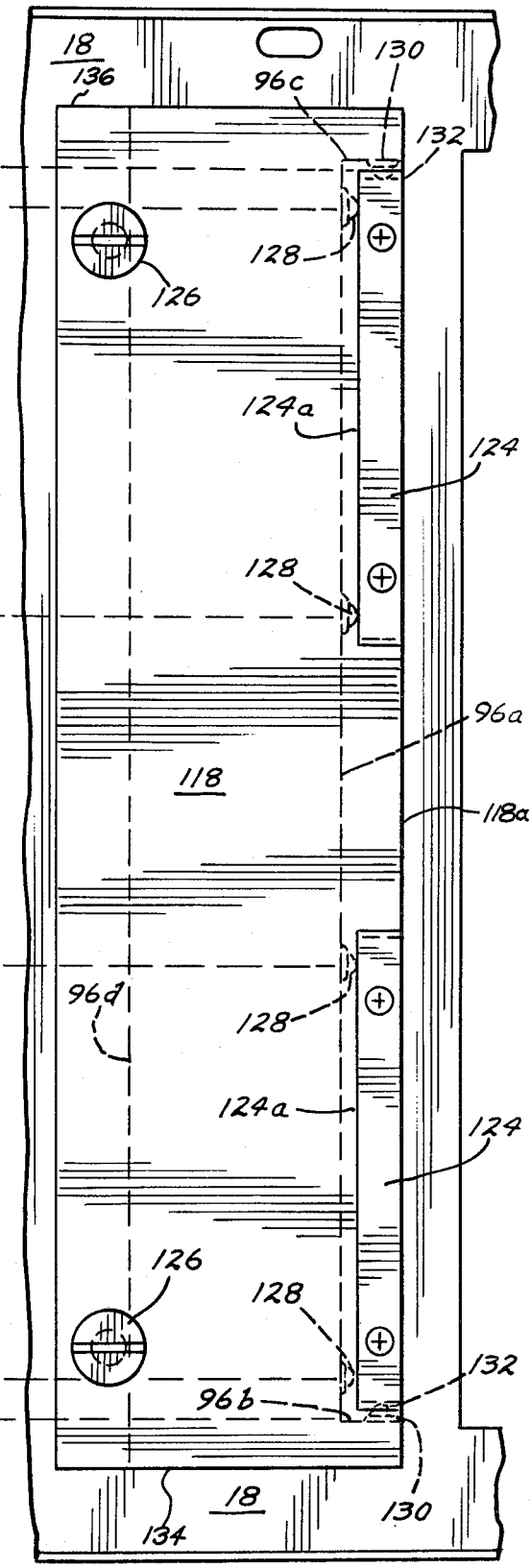
FIG. 10
FIG. 11

MODULAR PUNCH MARKING APPARATUS

REFERENCE TO CO-PENDING APPLICATIONS

Reference is made to co-pending applications by J. Bowe and J. Stewart Ser. No. 064,131 filed Aug. 6, 1979 and entitled "Adjustable Width Punch Marking Apparatus for Photographic Printer" and by R. Anderson and J. Wedel Ser. No. 063,675 filed Aug. 6, 1979 entitled "Adjustable Width Punch Marking Apparatus with Interchangeable Spacer Inserts", which are assigned to the same assignee as this application.

BACKGROUND OF THE INVENTION

1. Field of the Invention

The present invention relates to photographic processing equipment. In particular, the present invention is a modular marking system for providing cut and end-of-order marks on photographic print paper strips, and which may be rapidly connected and disconnected from a paper mask.

2. Description of the Prior Art

In commercial photographic processing operations very high rates of processing need to be achieved and maintained in order to operate profitably. To expedite the photographic processing, films of similar type and size are spliced together for developing and printing purposes. After the films are developed, a photographic printer prints the photographic images contained in the film in an edge-to-edge relationship on a continuous strip of photosensitive paper. The photographic printer causes high intensity light to be passed through the film and imaged on the photographic print paper, thereby exposing the photographic emulsion layers of the print paper. The print paper is subsequently removed from the printer and developed. A photographic paper cutter cuts individual prints from the strip, the prints are sorted by customer order (either manually or automatically), and are ultimately packaged and sent to the customer.

Automatic photographic paper cutters have been developed which automatically cut the print paper into individual prints. These automatic paper cutters are controlled by indicia which are placed along the print paper by the photographic printer. Typically the indicia are of two types: cut marks and end-of-order marks. Cut marks indicate the desired location of a cut between adjacent prints. End-of-order marks, which typically appear along the opposite edge of the print paper from the cut marks, indicate the end of a customer's order. The automatic paper cutter includes a sensor which senses the cut marks and causes the individual prints to be cut from the strip at desired locations. The separated prints are passed to an order packaging or grouping device which groups the prints in response to the end-of-order marks which are sensed by the automatic cutter.

In many photographic printers the cut marks and end-of-order marks are produced by solenoid driven paper punches, which punch a small hole or notch at or near the edge of the print paper. Another type of device for producing cut marks and end-of-order marks used small light sources positioned in the opposite edges of the print paper. The cut marks and end-of-order marks are produced by energizing the appropriate light source. This causes a small portion of the print paper to be exposed. The intensity and duration of the light from the light source creates a small dark photographically produced mark near the edge of the print paper.

It is important that the cut marks and end-of-order marks be placed in a predictable position with respect to the edges of the photographic print paper, so that the marks can be sensed reliably. In large photofinishing operations a photographic printer may be "dedicated" to a single size of print, and the position of the marking devices is originally set and is adjusted infrequently. In smaller photofinishing operations the same printer often is used to make prints of different sizes, which generally entails a change in the width of the print paper. In photographic printers which handle more than one width and length of print paper, the adjustments of the cut and end-of-order marking devices can prove to be quite time-consuming. Whenever the width of print paper is changed, the marking devices must be readjusted so that they have the proper position with respect to the edges of the print paper. Similarly, a change in length of print paper often entails a change in paper mask. This may also necessitate a removal and readjustment of the marking devices, particularly when the marking devices are attached to the paper mask. There is a need for improved cut and end-of-order marking devices which can be used with a variety of paper widths and lengths, while not requiring time-consuming adjustments.

SUMMARY OF THE INVENTION

The present invention is an indicia producing module for providing cut and/or end-of-order indicia on photographic print paper strips. The module can be quickly connected/disconnected to accommodate different paper lengths and different paper masks.

In the present invention, the print paper strips are transported along a paper path and are exposed to light from a photographic film original at a paper mask location. Fixedly attached to the paper mask are locating means for locating the indicia producing apparatus in both transverse and longitudinal directions with respect to the paper path. Connected to the indicia producing apparatus are engaging means for engaging the locating means. Snap lock means or releasable means retain the engaging means in an engaged relationship with the locating means.

In preferred embodiments of the invention, the locating means includes a mounting base which is fixedly attached to the paper mask, bar means which are fixedly attached to the mounting base, and registration pin means which are fixedly attached to the mounting base and spaced from the bar means. The engaging means connected to the indicia producing apparatus includes a pair of substantially vertical end plates and a rigid member which extends between the end plates. Ball plungers connected to the rigid member apply force against the bar means to hold the rigid member against the registration pins, thereby providing accurate location in the longitudinal direction with respect to the paper path. The end plates engage vertical sides of the mounting base to define the transverse location with respect to the paper path. The snap lock means includes groove means in the bar means and ball plungers connected to the rigid member for engaging the groove means.

BRIEF DESCRIPTION OF THE DRAWINGS

FIG. 3 is an inclined front view of the apparatus.

FIG. 4 is a side view of the punch assembly carriage taken along the line 4—4 in FIG. 3.

FIG. 5 is a top view of a spacer insert.

FIG. 6 is a cross-sectional view taken along the line 6—6 in FIG. 5.

FIG. 10 is a bottom view of the punch marking module.

FIG. 11 is a top view of a portion of the punch mask showing the mounting assembly for mounting the punch marking module.

DETAILED DESCRIPTION OF THE PREFERRED EMBODIMENT

Figure 1:
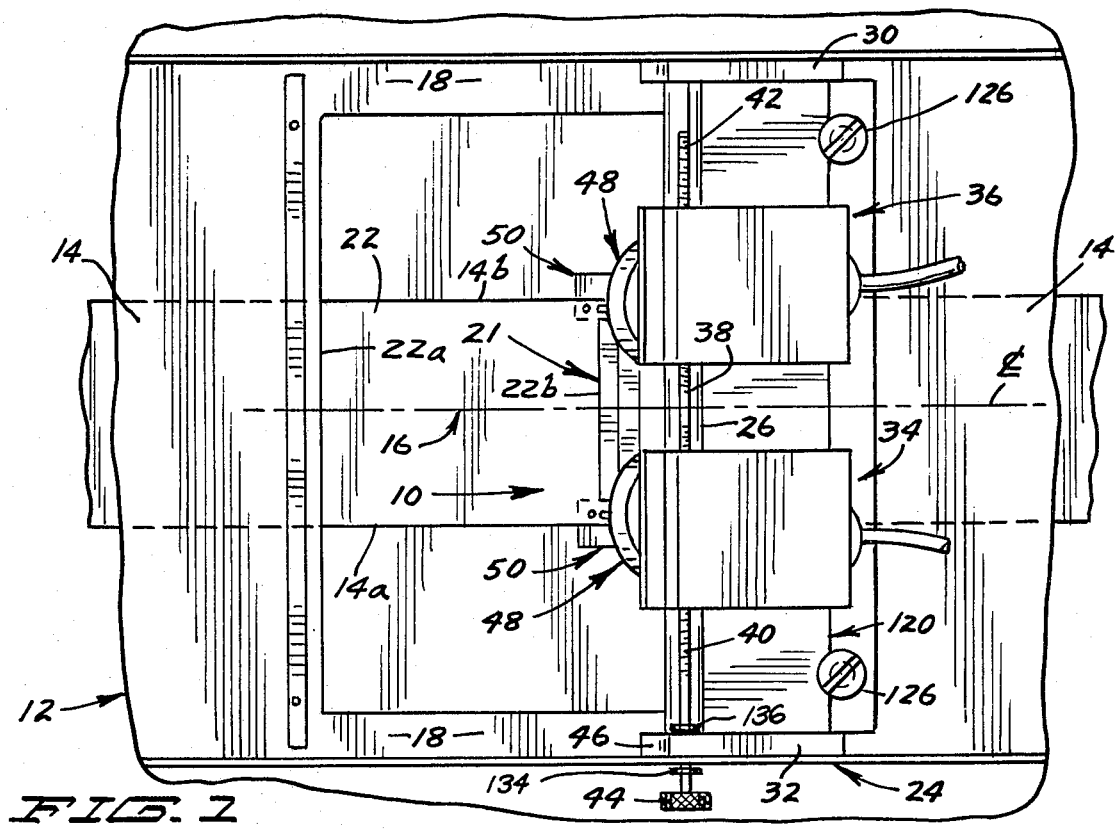
FIG. 1 is a top view of the apparatus of the present invention on a photographic printer.
Figure 2:
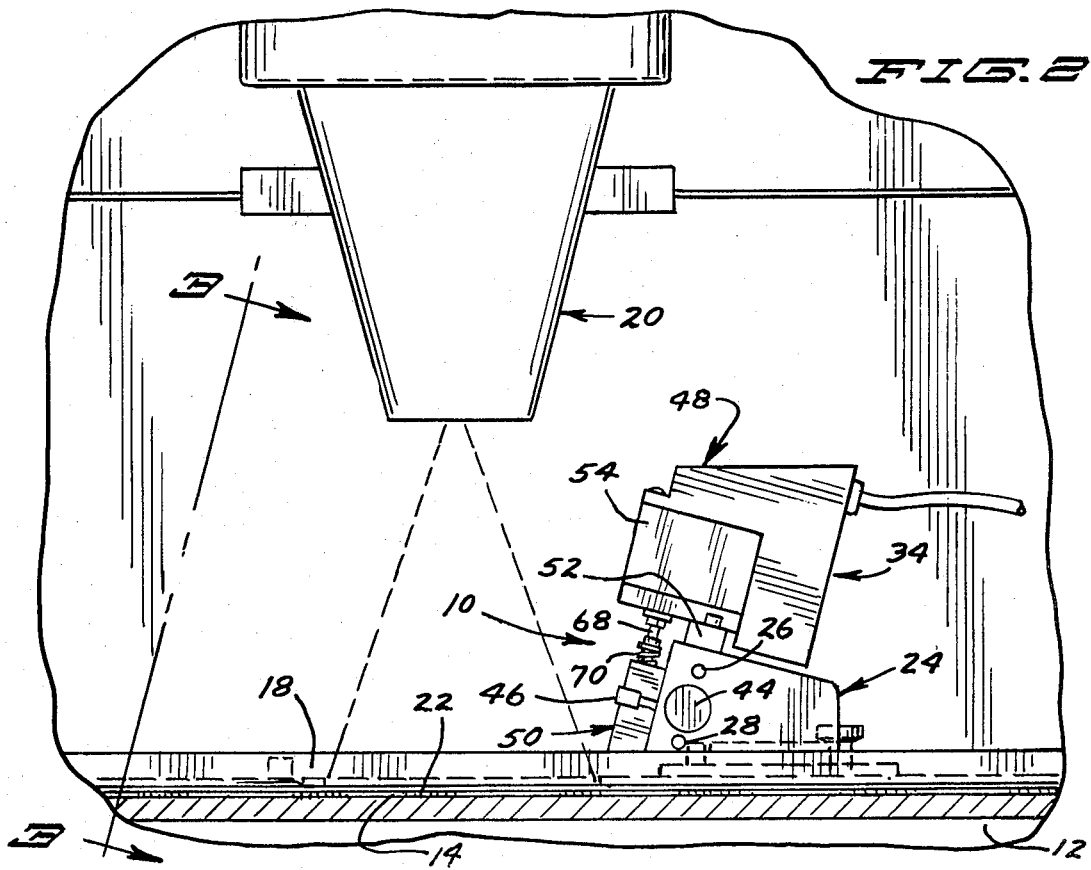
FIG. 2 is a side view of the apparatus of FIG. 1 including a portion of the optics of the photographic printer.

FIGS. 1 and 2 show a modular indicia producing apparatus generally indicated at 10 which utilizes the quick disconnect/connect mounting of the present invention. A photographic printer 12 has photographic print paper 14 being transported along a path defined by a center line 16. A paper mask 18 and a punch spacer insert 21 define two transverse borders 22a and 22b of exposed area 22 of the photographic print paper 14. The other two borders of the exposed area are defined by side edges 14a and 14b of the print paper 14, since the embodiment shown is producing borderless prints. FIG. 2 shows a portion of the optics 20 of the photographic printer 12 that is used to expose area 22.

In the embodiment shown in the Figures, apparatus 10 permits easy adjustment for different paper widths. This adjustable width feature is the subject matter of the previously mentioned co-pending application entitled "Adjustable Width Punch Marking Apparatus for Photographic Printer".

A guide means, generally indicated at 24 in FIGS. 1-3, defines a guide path transverse to the center line 16 of the print paper 14. The guide means 24 includes a plurality of guide rods also positioned transverse to the center line 16 of the print paper 14. In the preferred embodiment the guide means 24 includes top guide rod 26 and bottom guide rod 28. The top guide rod 26 and the bottom guide rod 28 are fixedly attached to left end plate holder 30 at one end and to right end plate holder 32 at the other end. The guide rods 26 and 28 are preferably made of a smooth metal.

A first carriage assembly 34 and a second carriage assembly 36 are slidably supported by and move along the path defined by the top guide rod 26 and the bottom guide rod 28. First carriage assembly 34 and second carriage assembly 36 are movable only on their respective sides of center line 16. Thus, the first carriage assembly 34 is movable only on the right side of the center line 16 and the second carriage assembly 36 is movable only on the left side of center line 16.

A carriage positioning lead screw 38 is positioned essentially parallel to the top guide rod 26 and bottom guide rod 28. The lead screw 38 has a first threaded portion 40 and a second oppositely threaded portion 42 for moving the first carriage assembly 34 and the second carriage assembly 36 along the guide path defined by the guide rods 26 and 28. The carriage assemblies 34 and 36 are positioned initially so as to move symmetrically in opposing directions about the center line 16 propelled by the threaded portions 40 and 42.

The lead screw 38 is rotatably attached preferably to right end plate holder 32 and has an adjustment screw knob 44 fixedly attached to one end for rotating the lead screw 38. The lead screw 38 is held in the position adjusted to by lead screw lock 46.

The carriage assemblies 34 and 36 include solenoid assembly 48, indicia producing assembly 50 and traversing block 52 as shown in FIGS. 3 and 4. The carriage assemblies 34 and 36 are mirror images of each other, and the same reference numerals are used to indicate similar components of assemblies 34 and 36.

The solenoid assembly 48 includes a solenoid 54, a solenoid support spacer 56, and a solenoid top plate assembly 58. The solenoid top plate assembly 58 is best seen in FIG. 4 and includes microswitch 60 mounted on bracket 62 and conductively connected to electrical connector 64 by electrical conductor 66. Microswitch 60 provides a signal which indicates when solenoid 54 has driven punch 72 downward into engagement with paper 14 and further provides a signal when punch 72 has retracted. These signals provide a failsafe check on the operation of punch 72 to ensure that punch 72 is not stuck.

The indicia producing assembly 50 is preferably a hole punch producing assembly which is actuated by solenoid rod 68. The assembly includes a spring bias 70, punch 72, punch guiding block 74, punch die 76 and chad deflector 78. The spring bias 70 is held in place by a retaining washer 80 and a recess 82 within punch guiding block 74. The spring bias 70 is preferably a coil spring coiled around the punch 72 biasing the punch 72 in a retracted position. Punch 72 engages punch die 76 to produce a punched hole in the print paper 14. The chad 84 produced by the punch 72 is deflected by chad deflector 78.

The solenoid assembly 54 and the indicia producing assembly 50 are fixedly attached to traversing block 52. The traversing block 52 slidably engages top guide rod 26 and bottom guide rod 28 and is propelled by carriage positioning lead screw 38.

The punch spacer insert 21, which is the subject of the previously mentioned co-pending application entitled "Adjustable Width Punch Marking Apparatus with Interchangeable Spacer Inserts", defines the spacing between the first carriage assembly 34 and the second carriage assembly 36 by being positioned between the two carriage assemblies. The punch spacer insert also defines one transverse border 22b of the exposed area 22 by an edge 86. Insert 21 also overlaps mask 18 at insert edge 87 (as best shown in FIG. 4) and acts as the light seal for shielding the remainder of the print paper to prevent double exposure.

Punch spacer insert 21 is held in place by a punch spacer key 88 engaging a punch spacer key recess 92 of the punch spacer 21 and a punch spacer shaft 90 (which is connected to punch spacer key 88) engaging a punch spacer shaft recess 94 of punch spacer 21. The mid point of the punch spacer key 88 is positioned on center line 16 as shown in FIG. 3 and is fixedly attached to rigid member 96, which in turn is fixedly attached to right holder end 32 and left holder end 30. The mid point of the recess 92 is the mid point of the punch spacer insert 21, and when recess 92 engages punch spacer key 88, exactly one-half of the punch spacer insert 21 is to the right of the center line 16 and the other half of the punch spacer insert 21 is to the left of the center line 16. The punch spacer insert 21 is held in place by a ball plunger 98 which engages punch spacer shaft 90, as best seen in FIG. 6. The ball plunger 98 allows the shaft 90 to be snapped into recess 94 and held in place and to be easily removed when a different punch spacer insert 21 is desired.

The punch spacer insert 21 also engages the punch die 76 of first carriage assembly 34 with right spacer insert end 100 at point 104 and engages the punch die 76 of the second carriage assembly 36 with left spacer insert end 102 at point 105. The punch spacer insert 21 has a slot 106 at both right end 100 and left end 102, as shown in FIG. 5. Slot 106 provides clearance for punch 72 to pass through in punching print paper 14. In general, slot 106 is made as small as practical while still providing the necessary clearance, since the area of print paper 14 under slot 106 will be double-exposed, and the extent of this double-exposed area should be as small as possible.

Figure 7:
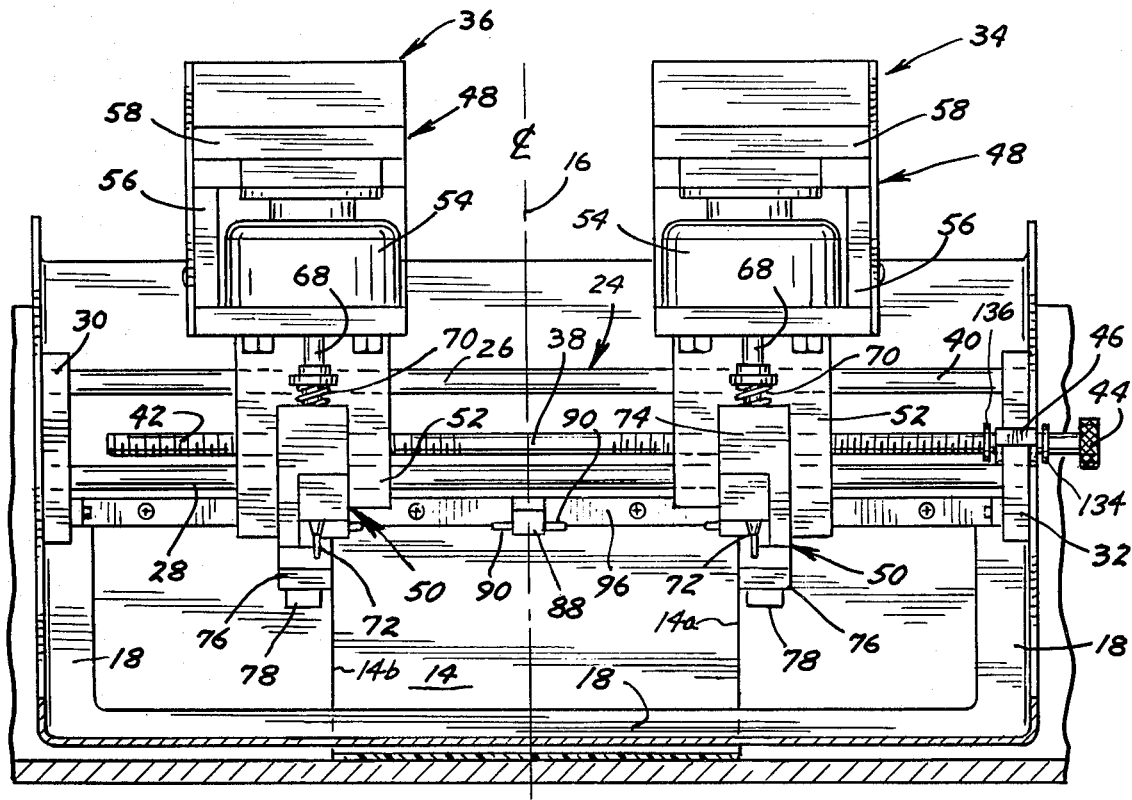
FIG. 7 is an inclined front view of the apparatus without the spacer insert in place.

FIG. 7 shows the apparatus without the spacer insert 21 in place and with carriage assemblies 34 and 36 spaced slightly further apart than their final spacing after insert 21 is inserted. In FIG. 7 paper 14 has been threaded and both edges 14a and 14b of print paper 14 ride atop the punch die 76 of the indicia producing assembly 50. The punch spacer insert 21 is then inserted on top of the print paper 14 and the first and second assemblies 34 and 36 are moved toward the spacer insert 21 by turning screw knob 44 until the assemblies engage the insert. The paper travels between the punch die and the punch spacer insert. An alternative method is to insert the punch spacer insert and engage it with the carriage assemblies prior to threading the print paper 14 between the punch die and the punch spacer insert. However, this method is more difficult to do in the dark.

Figure 8:
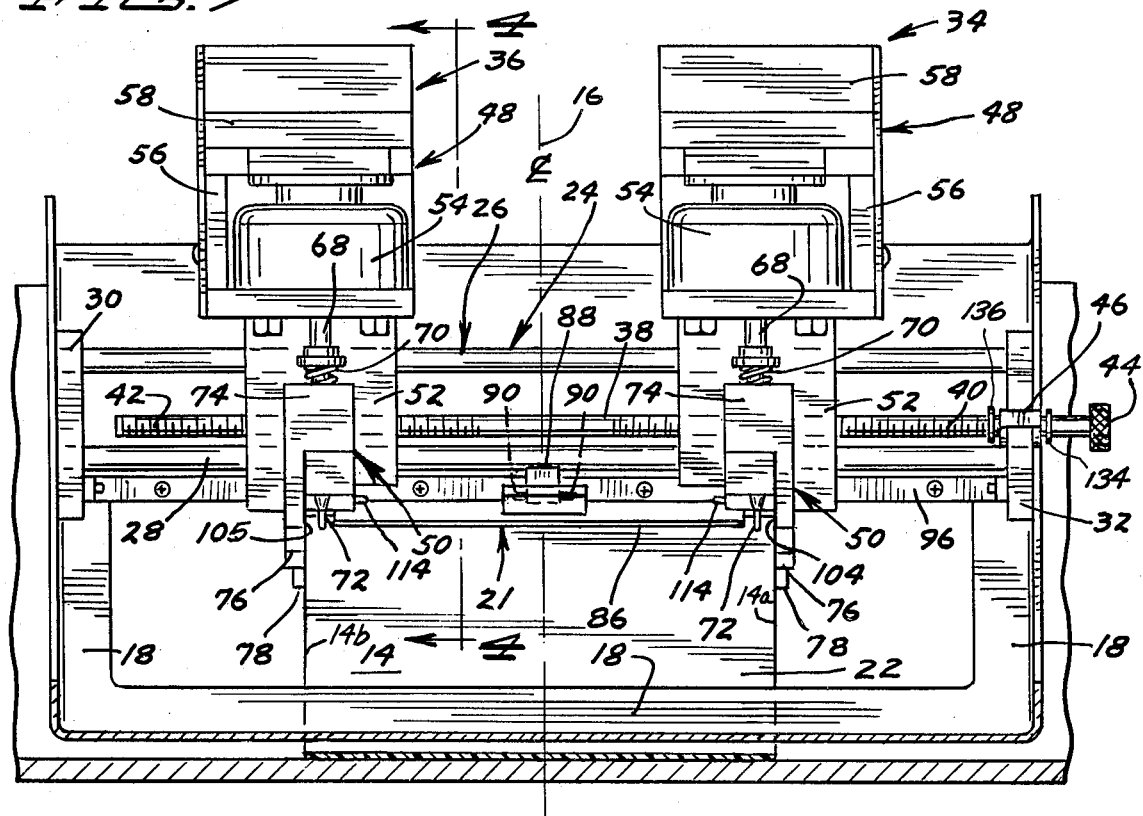
FIG. 8 is an inclined front view of the apparatus with a side spacer insert.
Figure 8:
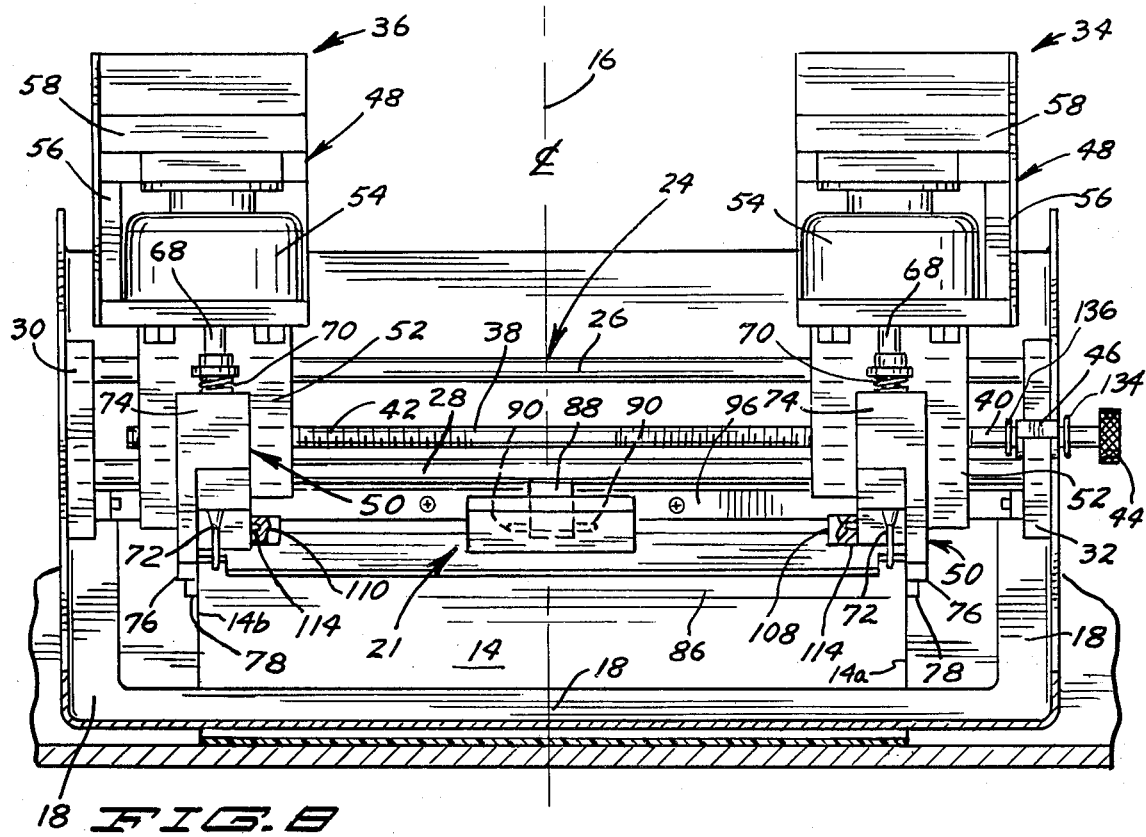

For wider paper widths and thus wider punch spacer inserts 21, the punch spacer insert 21 includes guide punch spacer blocks 108 and 110 for further support as shown in FIG. 8. The spacer blocks 108 and 110 engage pins 114 which are fixedly attached to punch guiding blocks 74 of both first carriage assembly 34 and second carriage assembly 36. Engagement of guide punch spacer blocks 108 and 110 with pins 114 prevent possible movement at the end of the wide punch spacer insert 21.

Figure 9:
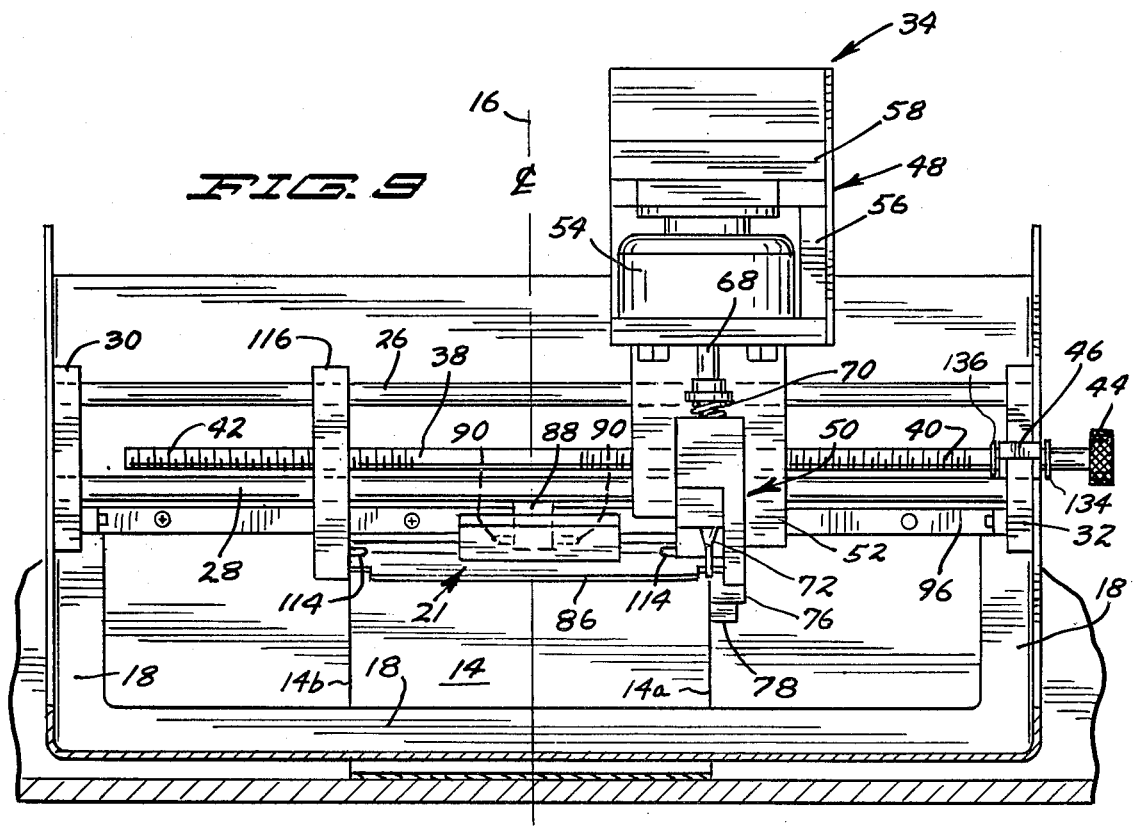
FIG. 9 is a front view of the apparatus with a spacer insert between a carriage assembly and a dummy carriage.

In some photofinishing operations, only cut marks are needed, and end-of-order marks are unnecessary. FIG. 9 shows an embodiment in which only cut marks are produced along edge 14a of print paper 14. In FIG. 9 a dummy carriage assembly 116 replaces second carriage assembly 36. Dummy carriage assembly 116 slidably engages top guide rod 26 and bottom guide rod 28, and is propelled by carriage position lead screw 38 and engages spacer insert 21 in the same manner as second carriage assembly 36 (which it has replaced), but does not have the indicia producing assembly 50 or the solenoid assembly 48. The purpose of the dummy carriage assembly 116 is to provide the capability of producing indicia on only one side of print paper 14 and still provide an engaging surface for punch spacer insert 21. The dummy carriage 116 also has a pin 114 to engage a guide punch spacer block of a wide punch spacer insert. Similarly in operations in which cut marks only are desired along edge 14b, a dummy carriage assembly which is the mirror image of dummy carriage 116 replaces first carriage assembly 34.

As shown in the Figures, the punch marking apparatus of the present invention forms a module which is attached to paper mask 18 by a quick connect/disconnect mounting assembly. When a different print length is desired, thereby necessitating a different paper mask, the entire punch marking module is quickly disconnected from the paper mask, the previous paper mask is removed and a new paper mask is inserted, and the punch marking module is connected to the new paper mask. The quick connect/disconnect mounting assembly automatically centers the punch marking module properly with respect to the paper mask.

The quick connect/disconnect mounting assembly of the present invention is best illustrated in FIGS. 4, 10 and 11. FIG. 4 is a sectional view of the entire assembly; FIG. 10 is a bottom view of the entire punch marking module; and FIG. 11 is a top view of paper mask 18 showing the portion of paper mask 18 which receives and holds the punch marking module. In FIG. 11, the position of rigid member 96 of the punch marking module is illustrated in phantom.

As shown in the Figures, the connection of the punch marking module and paper mask 18 is made by means of rigid member 96, which extends between end plate holders 30 and 32 and forms the bottom of the punch marking assembly. Connected to the top surface of mask 18 is mounting base 118. A pair of detent bars 124 are attached to the top surface of mounting base 118 proximate edge 118a, which is closest to the open area of mask 18. Positioned proximate opposite edge 118b of mounting base 118 are two upstanding guide or registration pins 126.

Rigid member 96 has four ball plungers 128 positioned along edge 96a. In addition, member 96 has a ball plunger 130 at each end 96b and 96c. When the punch marking module is connected to mask 18, edge 96d of member 96 is inserted under the heads of registration pins 126 and member 96 is pivoted downward until ball plungers 128 and 130 engage detent bars 124. Ball plungers 128 engage surfaces 124a of detent bars 124 and apply force to member 96 to hold edge 96d securely against registration pins 126. Ball plungers 130 engage recesses or grooves 132 at the ends of detent bars 124 and side edges 134, 136 of the mounting base engage end plate holders 30, 32. The ball plungers 130 and grooves 132 form a snap lock means for releasably holding member 96, and therefore the punch marking module, in engagement with mounting base 118. The end plate holders 30, 32 engaging the mounting base sides 134, 136 hold the punch marking module securely in the transverse direction.

When removal of the punch marking module is desired, the assembly is pivoted to pop ball plungers 130 out of grooves 132 and to move ball plungers 128 out of engagement with surfaces 124a of detent bars 124. Member 96 is then moved out of engagement with registration pins 126 and the entire module is lifted away from paper mask 18.

Although the present invention has been described with reference to a preferred embodiment, persons skilled in the art will recognize that changes may be made in form and detail without departing from the spirit and scope of the invention. For example, the preferred embodiments shown in the Figures use a punch type of indicia producing apparatus. It can be seen, however, that the present invention is equally applicable to other types of indicia producing devices such as light sources for photographically producing cut and end-of-order marks which are supported by the carriage assemblies.

What is claimed is:

1. In a photographic printer in which indicia producing apparatus provides indicia at selected locations on a print paper strip that is transported along a paper path and is exposed to light from a photographic film original at a paper mask location, the improvement comprising:
   locating means fixedly attached to the paper mask for locating the entire indicia producing apparatus in both transverse and longitudinal directions in a fixed and predetermined position with respect to the paper path;
   engaging means connected to the entire indicia producing apparatus for engaging the locating means; and
   snap lock means for retaining the engaging means in an engaged relationship with the locating means in a fixed and predetermined position.

2. In a photographic printer wherein indicia producing apparatus provides indicia at selected locations on a print paper strip that is transported along a paper path and is exposed to light from a photographic film original at a paper mask location, the improvement comprising:
   support means for supporting the indicia producing apparatus, the support means including first and second substantially vertical end plate members and a rigid member extending therebetween;
   locating means fixedly attached to a paper mask for receiving the support means and locating the support means in both transverse and longitudinal directions with respect to the paper path; and
   releasable means for retaining the support means in an engaged position with the locating means.

3. The invention of claim 2 wherein the rigid member is a rigid flat plate.

4. The invention of claim 2 wherein the locating means comprises bar means mounted on a mounting base.

5. The invention of claim 4 wherein the locating means further comprises registration pin means mounted on the mounting base and spaced from the bar means.

6. The invention of claim 5 wherein the releasable means comprises:
   groove means in the bar means;
   an engaging surface of the bar means facing the rigid member; and
   ball plunger means attached to the rigid member for engaging the groove means and the engaging surface thereby holding the support means in an engaged position with the receiving means with the rigid member against the registration pin means.

7. The invention of claim 6 wherein the first and second end plate members engage first and second substantially vertical sides of the mounting base to locate the support means in the transverse direction with respect to the paper path.

8. In a photographic printer in which indicia producing apparatus provides indicia at selected locations on a print paper strip that is transported along a paper path and is exposed to light from a photographic film original at a paper mask location, the improvement comprising:
   locating means fixedly attached to the paper mask for locating the indicia producing apparatus in both transverse and longitudinal directions with respect to the paper path;
   engaging means connected to the indicia producing apparatus for engaging the locating means;
   snap lock means for retaining the engaging means in an engaged relationship with the locating means; and
   wherein the locating means comprises:
      a mounting base fixedly attached to the paper mask and having vertical sides substantially parallel to the paper path for locating the engaging means in a transverse direction with respect to the paper path;
      bar means fixedly attached to the mounting base and perpendicular to the paper path; and
      registration pin means fixedly attached to the mounting base and spaced from the bar means.

9. The invention of claim 8 and further comprising:
   means for applying a force between the engaging means and the bar means to hold the engaging means against the registration pin means.

10. The invention of claim 9 wherein the engaging means comprises:
    mounting base engaging means for locating the indicia producing apparatus transversely with respect to the paper path by engaging the vertical sides of the mounting base parallel to the paper path; and
    registration pin engaging means for engaging the registration pin means.

11. The invention of claim 10 wherein the mounting base engaging means comprises a pair of substantially vertical end plates, and wherein the registration pin engaging means comprises a rigid member extending between the vertical end plates.

12. The invention of claim 11 wherein the snap lock means comprises:
    groove means in the bar means; and
    first ball plunger means connected to the rigid member for engaging the groove means.

13. The invention of claim 12 wherein the groove means comprises first and second grooves at opposite ends of the bar means.

14. The invention of claim 12 wherein the means for applying a force comprises:
    second ball plunger means connected to the rigid member for applying a force against the bar means to hold the rigid member against the registration pins.

* * * * *